United States Patent [19]
>
> Murakawa et al.

[11] Patent Number: 4,903,469
[45] Date of Patent: Feb. 27, 1990

[54] LAWN MOWER

[75] Inventors: Masatake Murakawa; Niro Bando, both of Sakai; Masatsugu Tone, Hashimoto; Mikio Yuki, Kawachinagano; Junji Miyata, Kyoto; Tetsuaki Hayashi, Osaka; Kazuaki Kurohara, Sakai, all of Japan

[73] Assignee: Kubota, Ltd., Osaka, Japan

[21] Appl. No.: 109,347

[22] Filed: Oct. 16, 1987

[30] Foreign Application Priority Data

Oct. 21, 1986 [JP] Japan .................. 61-251290
Oct. 21, 1986 [JP] Japan .................. 61-161736
Oct. 21, 1986 [JP] Japan .................. 61-161737

[51] Int. Cl.$^4$ .......................................... A01D 34/70
[52] U.S. Cl. ................................. 56/202; 56/16.6
[58] Field of Search .............................. 56/202, 16.6

[56] References Cited

U.S. PATENT DOCUMENTS

| | | | |
|---|---|---|---|
| 3,716,977 | 2/1973 | Jackson | 56/202 |
| 4,522,019 | 6/1985 | Edwards et al. | 56/202 |
| 4,532,755 | 8/1985 | Schemelin et al. | 56/202 |
| 4,532,756 | 8/1985 | Merkel | 56/202 |
| 4,589,251 | 5/1986 | Amano et al. | 56/202 |
| 4,637,202 | 1/1987 | Lamusga | 56/202 |

Primary Examiner—John Weiss
Attorney, Agent, or Firm—Jordan and Hamburg

[57] ABSTRACT

A lawn mower comprising a cutting unit disposed between front and rear wheels, a grass discharge duct extending rearwardly from the cutting unit, and a grass collecting container defining a top opening for receiving grass clippings sent through the discharge duct. The grass collecting container includes a mouthpiece extending along peripheries of the top opening to rest on a U-shaped support frame mounted at a rear end of the mower. The mouthpiece is connected to the support frame by a projection and bore engagement. The support frame includes a holder defining an upwardly opening recess, and the container has a cover defining a downwardly opening recess at a position opposed to the holder. The two recesses define an opening for receiving a rear end of the grass discharge duct. The grass discharge duct includes an annular engagement portion extending peripherally of the rear end thereof for engagement with inner edges of the two recesses.

7 Claims, 6 Drawing Sheets

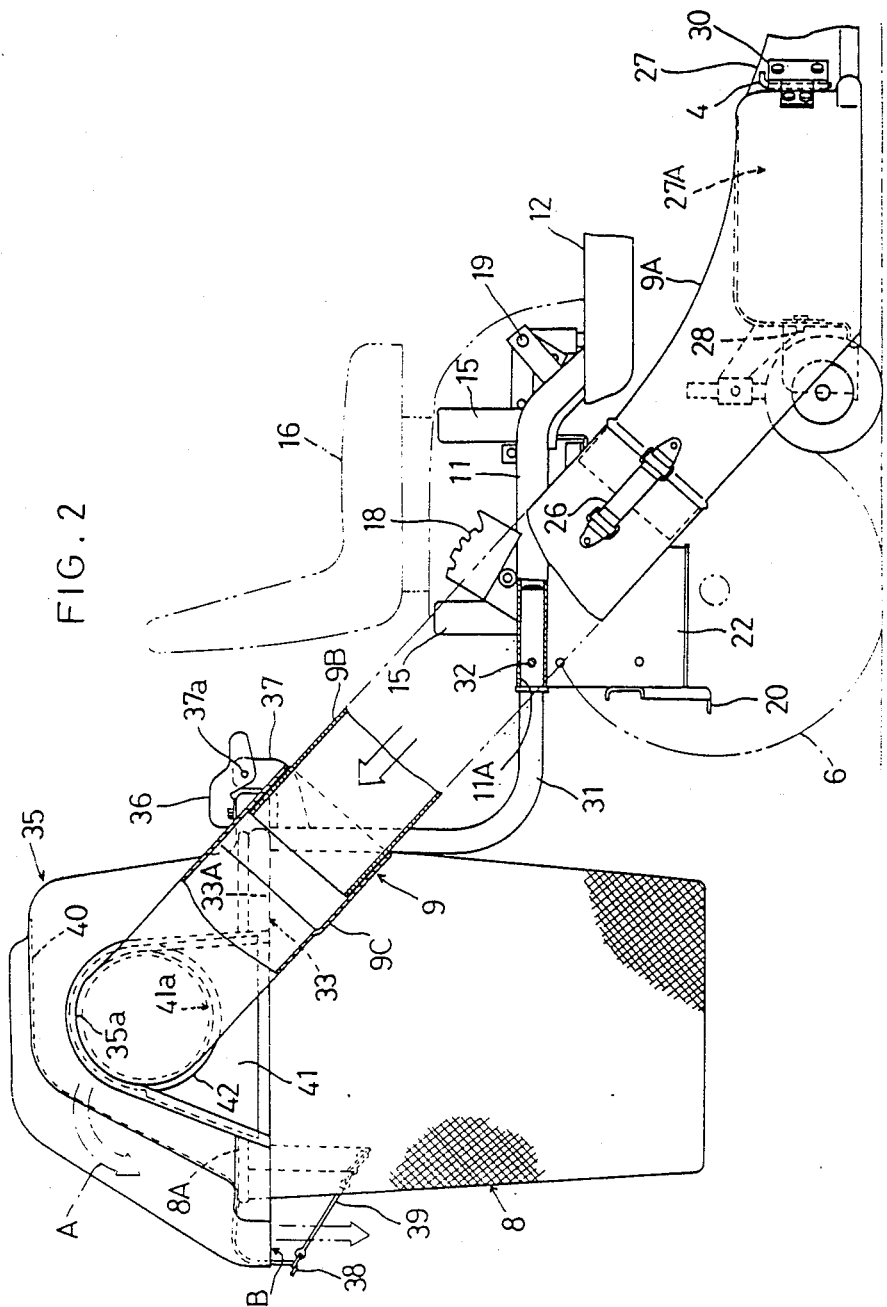

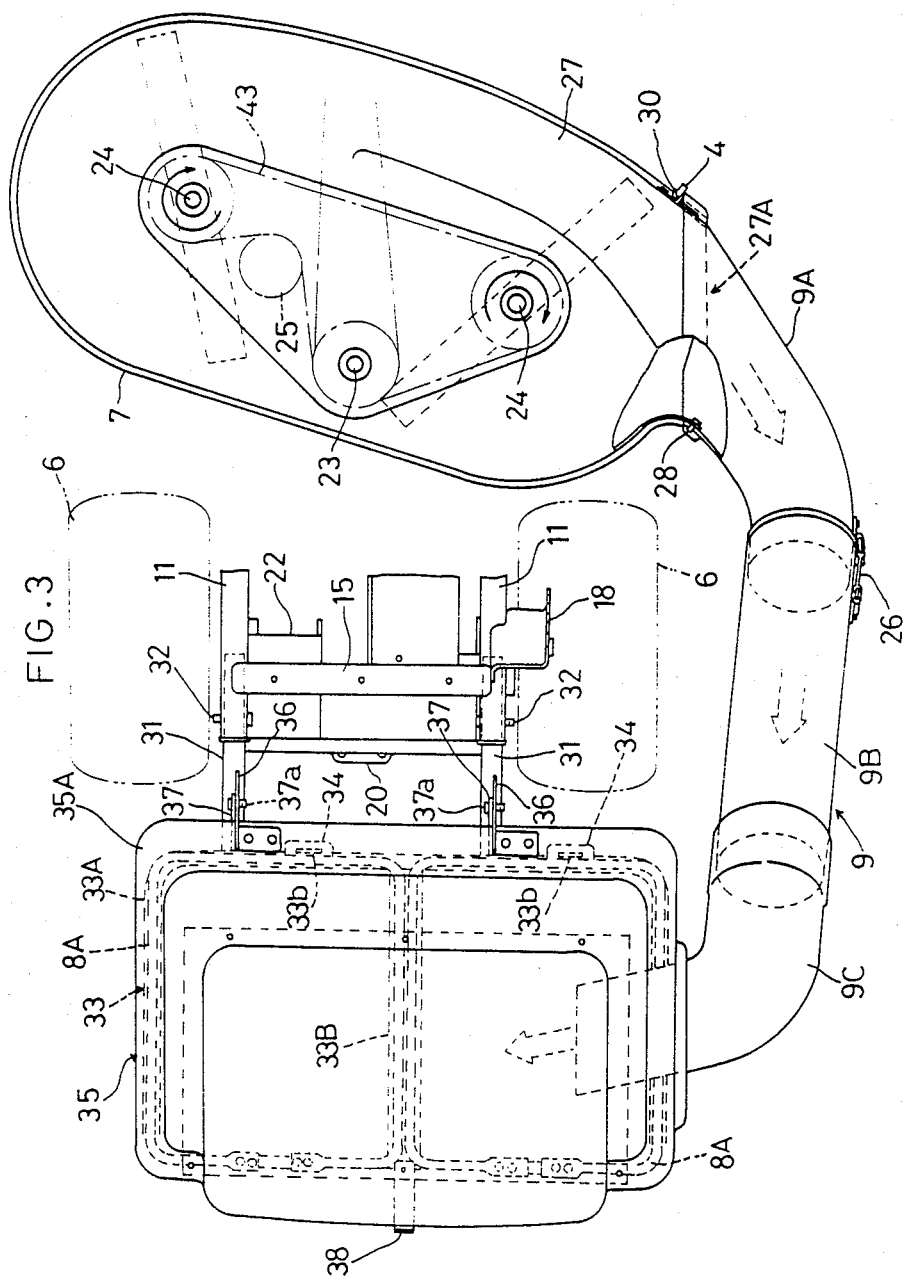

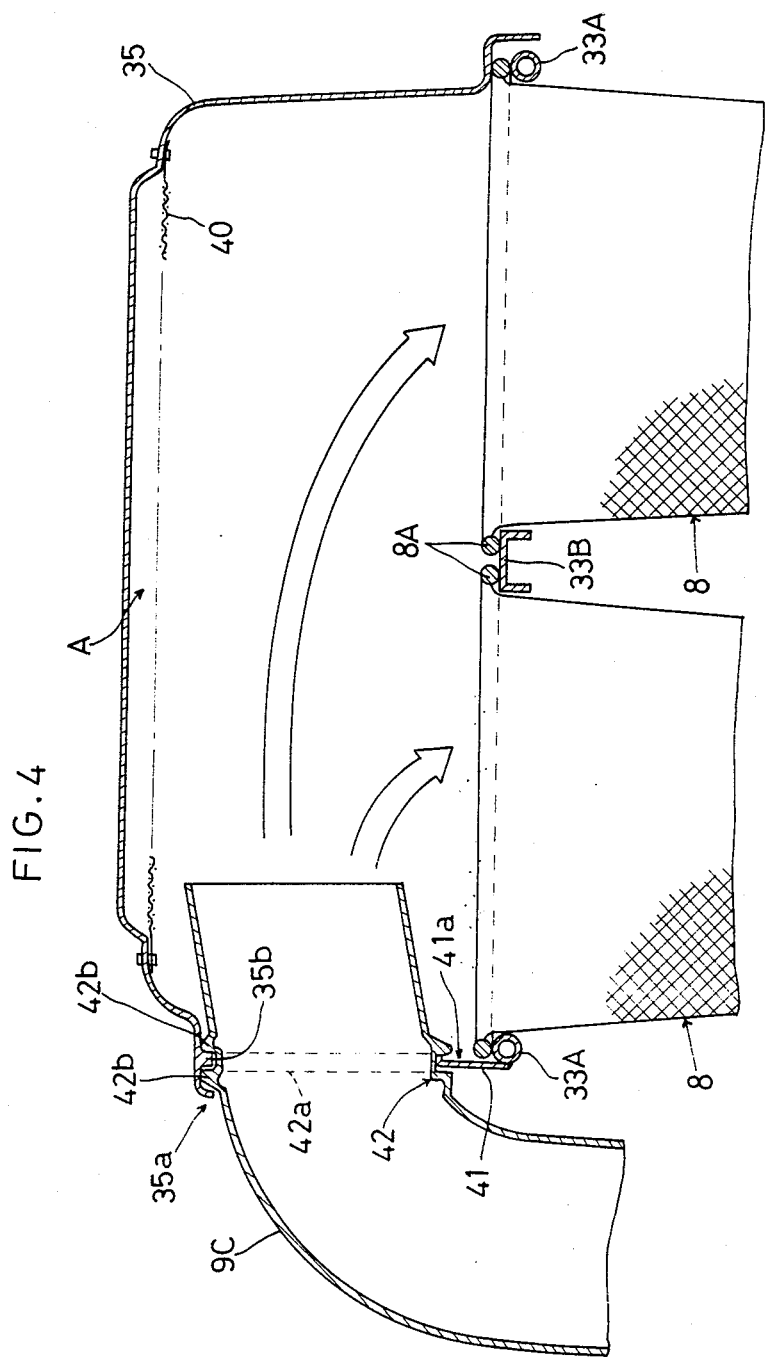

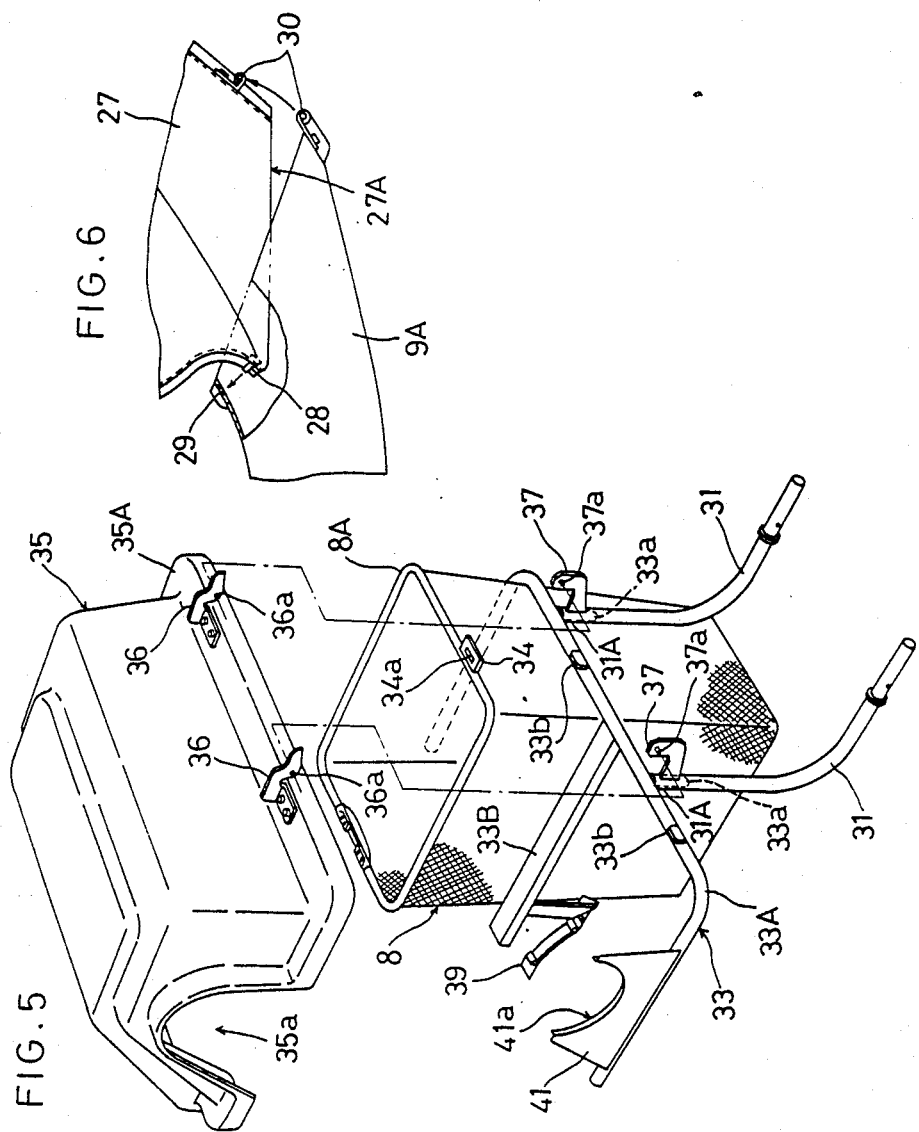

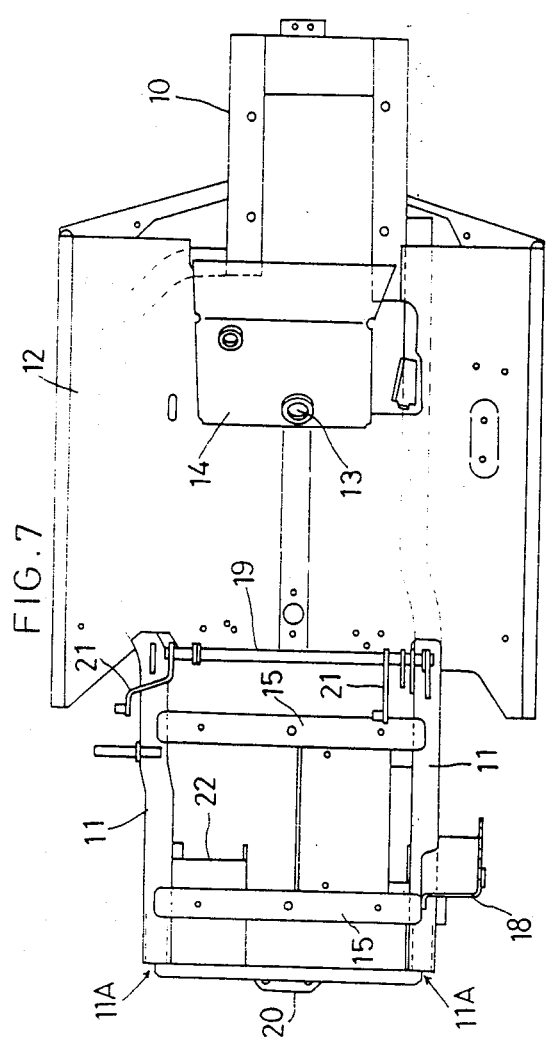
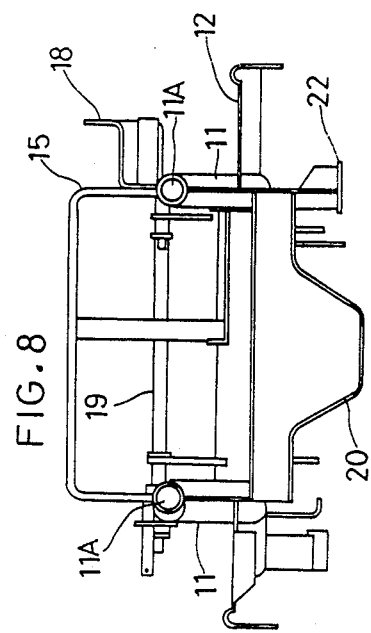

LAWN MOWER

BACKGROUND OF THE INVENTION

The present invention relates to an improvement in a lawn mower.

A known lawn mower carries a pair of right and left grass collecting containers connected to a mower body through projections formed at opposite top ends of a pipe frame of inverted U-shape extending upwardly from the mower body. Each of the grass collecting containers includes a mouthpiece extending along peripheries of a top opening thereof The mouthpiece includes a bracket defining an engaging bore engageable with the projection of the pipe frame, and a position setting mechanism for sandwiching outer peripheries of the pipe frame having the inverted Ushape. (See, for example, the Japanese utility model application laid open under No. 60-94037 and U.S. Pat. No. 4,589 251.)

With the above construction, however, the load of each grass collecting container acts through the bracket on one point of the mouthpiece, the mouthpiece supporting the container and being supported in a cantilever fashion. As grass clippings accumulate in the container, the mouthpiece becomes deformed to develop a space between the mouthpiece and a cover placed on the container, through which space grass clippings often leak It is possible to provide a strong mouthpiece against such deformation, but then the mouthpiece itself must be large. The bracket and the projection associated with the mouthpiece have to be large and strong also.

Furthermore, the known lawn mower has a grass discharge duct extending rearwardly from a grass cutting unit to be connected at a rear end thereof to the grass collecting containers. The rear end of the duct extends into a space above the containers through a bore defined in an openable and closable cover placed on the containers.

Since in this conventional construction the duct simply extends through the bore, dust and grass clippings may leak through a gap between the duct and the bore. It is therefore necessary to fill the gap with an element such as a rubber plate. The rubber plate is fixed at a proximal end thereof to the duct or to a cover wall defining the bore, with a distal end or ends thereof just contacting the duct or the cover wall to which the rubber plate is not fixed. The duct is movable with reaping height variations of the grass cutting unit, and the rubber plate cannot follow this movement of the duct. Consequently, the provision of the rubber plate or the like is inadequate for positively stopping the dust and grass clippings leaking with conveying air flowing from the cutting unit.

SUMMARY OF THE INVENTION

A first object of the present invention is to provide an improved support structure for the grass collecting container, which is effective to check the deformation of the mouthpiece of the container without increasing strength of the materials forming the mouthpiece and associated therewith.

In order to achieve this object, a lawn mower according to the invention comprises, a support frame extending upwardly from a mower body, grass collecting containers supported by the support frame and each having a top opening, the grass collecting containers each including a mouthpiece extending along peripheries of the top opening, a projecting piece fixed to one of the support frame and the mouthpiece, and a receiving bore defined in the other of the support frame and the mouthpiece, the projecting piece and the receiving bore being engageable with each other to connect the grass collecting container to the support frame, and a support member connected to an upper portion of the support frame for supporting the peripheries of the grass collecting containers.

In the above construction, the mouthpiece of each grass collecting container is connected to the support frame extending upwardly from the mower body, through the engagement between a projecting piece fixed to one of the support frame and the mouthpiece and a receiving bore defined in the other of the support frame and the mouthpiece. This enables the grass collecting containers to be set in position relative to the support frame. Moreover, the containers are supported at the peripheries of the top openings thereof by the support member connected to an upper portion of the support frame, whereby the containers are supported by the support member over wide ranges around the top openings. This arrangement permits the mouthpieces per se to have a reduced strength since the grass collecting containers are not supported at one point thereof in the cantilever fashion as in the prior art.

Consequently, the above construction has two features, i.e. that the position setting device (the projection and engaging bore) and the container support structure (the support frame and support member) are formed of separate elements and not integrally, and that the container support structure supports the peripheries of the top openings of the grass collecting containers. These features are effective to prevent deformation of the mouthpieces without requiring the mouthpieces to be strong or large, and to prevent leakage of grass clippings.

A second object of the present invention is to provide a simple modification of the cover and the support structure for the grass collecting containers to realize excellent sealing.

In order to achieve this object a lawn mower according to the present invention comprises, a support frame provided on a mower body and including a holder defining an upwardly opening recess, grass collecting containers supported by the support frame and each having a top opening, an openable and closable cover mounted on the grass collecting containers and including a lateral side defining a downwardly opening recess at a position opposed to the holder, a grass discharge duct extending from a cutting unit of the lawn mower, the grass discharge duct having a rear end thereof received in an opening defined by the upwardly opening recess of the holder and the downwardly opening recess of the cover in a closed position, and an annular engagement portion extending peripherally of the rear end of the grass discharge duct for engagement with inner edges of the two recesses.

The annular engagement portion of the grass discharge duct realizes a tight contact between this engagement portion and the inner edges of the two recesses. This tight contact has a sealing function with respect to the grass clippings and dust, and also a position setting fuction with respect to the duct since the tight contact is provided by the engagement of the three parts.

Since the duct receiving device is defined jointly by the stationary holder and the openable and closable cover, the engagement portion of the duct does not obstruct connection thereto of the duct.

Consequently, the engagement portion provided around an outer periphery of the grass discharge duct checks clattering due to vibrations of the mower body or the like without necessitating a separate duct position setting device. Since this engagement portion is annular, an excellent sealing effect is produced to stop leakage of the grass clippings through the position where the duct extends into the grass collecting containers and the cover.

Other objects and advantages of the present invention will be apparent from the following description.

BRIEF DESCRIPTION OF THE DRAWINGS

FIG. 2 is a side view showing an arrangement of a grass discharge duct, grass collecting containers and a mower body, FIG. 3 is a plan view showing the arrangement of the grass discharge duct, grass collecting containers and mower body, FIG. 4 is a front view in vertical section showing a connection between the discharge duct and a movable cover/support structure, FIG. 5 is a perspective view showing how the grass collecting containers are attached to the mower body, FIG. 6 is a plan view showing a position of a cutting unit and the grass collecting containers before connection to each other, FIG. 7 is a plan view of a frame structure of the mower body, and FIG. 8 is a rear view of the frame structure of the mower body.

DESCRIPTION OF THE PREFERRED EMBODIMENT

Figure 1:
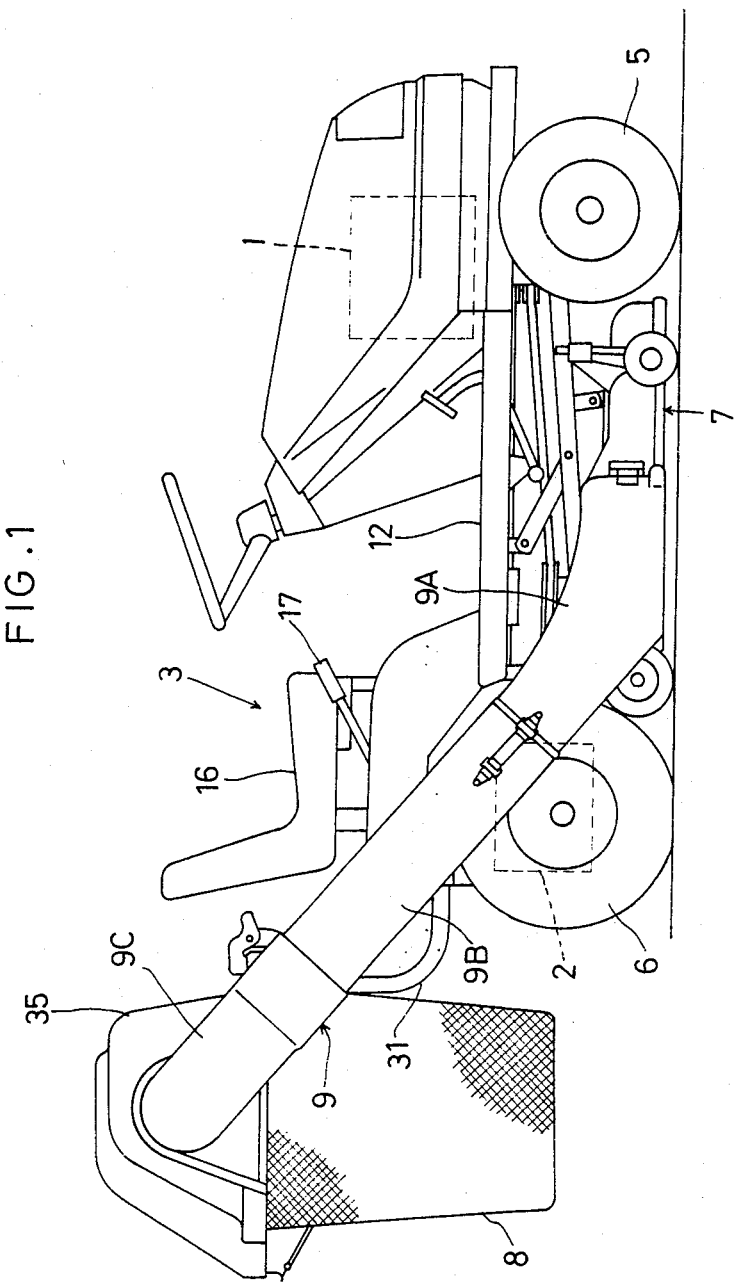
FIG. 1 is a side elevation of a lawn mower.

As shown in FIG. 1, a riding lawn mower comprises an engine 1 mounted at a front portion thereof and having a downwardly extending output shaft, a transmission case 2 mounted at a rear portion thereof, and a driver's section 3 between the engine 1 and the transmission case 2. A midmount type grass cutting unit 7 is disposed between front wheels 5 and rear wheels 6. Grass collecting containers 8 are attached to a rear end of the mower, and a grass discharge duct 9 extends from the cutting unit 7 laterally outwardly of the mower and rearwardly to the grass collecting containers 8.

A framework forming the vehicle body will be described next. As shown in FIG. 2, 3, 7 and 8, the framework comprises an engine support frame 10 including a pair of right and left angle bars connected to each other. A pair of right and left main frames 11 formed of pipes extends rearwardly from the engine support frame 10, with rear ends thereof cut to define openings 11A. A flat deck 12 formed of sheet metal extends over top faces of the right and left main frames 11. A steering mechanism support frame 14 defining a bore 13 for receiving a steering stem extends upwardly from a portion of the deck 12 adjacent the engine support frame 10. The main frames 11 support a pair of erected block frames 15 arranged longitudinally of the mower at rearward portions of the main frames 11, which block frames constitute a support frame for a driver's seat 16 and fenders of the rear wheels 6. Laterally of the driver's seat support frame 15 there are provided a lever 17 for adjusting a cutting height of the grass cutting unit 7 and a lever locking frame 18. Control operations of the lever 17 are transmitted to the cutting unit 7 through a control shaft 19 and pivot arms 21. At the rear end of the main frames 11 there is provided a hitch 20 for connecting a small trailer, which is fabricated by welding plate materials into a channel form, and a frame 22 for mounting the transmission case 2 extends forwardly from the hitch 20.

The cutting unit 7 is driven through a transmission system including an input pulley shaft 23 operatively connected to the engine 1 by a belt, and a belt 43 transmitting power from the input pulley shaft 23 to a pair of right and left blade shaft 24. Number 25 in FIG. 3 indicates a tension pulley.

The grass discharge duct 9 will be described next. As shown in FIGS. 2 and 3, the grass discharge duct 9 extends from the grass cutting unit 7 to the grass collecting containers 8, laterally outwardly bypassing the right rear wheel 6. The grass discharge duct 9 comprises a front duct 9A connected to the cutting unit 7, a rear duct 9C extending to the grass collecting containers 8, and an intermediate duct 9B interconnecting the front and rear ducts 9A and 9C. The intermediate duct 9B is formed of a transparent plastic material to enable the driver to see conveyance conditions of the grass clippings. The rear duct 9C has a forward end surrounding a rear end of the intermediate duct 9B for relative axial sliding movement therebetween to allow for vertical movements of the cutting unit 7 incidental to reaping height adjustment thereof. The intermediate duct 9B has a forward end surrounding a rear end of the front duct 9A, and is fixed to the front duct 9A by a rubber band type metal clasp 26. The front duct 9A has a sectional shape changing from circular to rectangular progressively toward the cutting unit 7 to be connected to the cutting unit 7 with a forward end thereof surrounding a rectangular outlet opening 27A defined in an outer case 27 of the cutting unit 7. This connection includes an engaging pin 28 secured to and projecting from a lateral wall of the outlet opening 27A, and a perforation 29 defined in a lateral wall of the front duct 9A (FIG. 6) which is penetrated by the engaging pin 28. On the opposite side of the connection the front duct 9A and the lateral wall of the outlet opening 27A carry coupling elements which form a hinge-like clasp 30 when interconnected. An L-shaped pin 4 is inserted from above into the clasp 30 after the front duct 9A is placed around the outlet opening 27A, thereby completing the connection between the front duct 9A and the outer case 27 of the cutting unit. As shown in FIG. 6, the front duct 9A is connected to the outer case 27 by first placing the perforation 29 in the front duct 9A in engagement with the engaging pin 28, then pivoting the front duct 9A about the engaging pin 28, and fastening the clasp 30 with the L-shaped pin 4.

A mounting structure for the grass collecting containers 8 will be described next. As shown in FIGS. 2 through 5, support frames 31 formed of pipes and acting as connecting means extend into the rear end openings 11A of the main frames 11 and are detachably connected to the main frames 11 by engaging pins 32 acting as fixing means extending through the support frames 31 and the main frames 11. The support frames 31 include rear end portions extending upwardly and terminating with upwardly directed openings 31A to which a fixing frame 33 is securely connected to act as support member for supporting a pair of right and left grass collecting containers 8 described later. This connecting structure includes a pair of right and left engaging pipe elements 33a projecting downwardly from the fixing frame 33 and inserted into the upwardly directed openings 31A of the support frames 31. This fixing frame 33 has a substantially E-shaped construction when viewed in plan, consisting of a pipe frame 33A substantailly U-shaped in plan view and a center channel frame 33B, and extends rearwardly in a cantilever fashion. Each of the grass collecting containers 8 has a top opening with a mounthpiece 8A extending along peripheries of the top opening. The grass collecting containers 8 are set in position on the fixing frame 33 so that the mouthpieces 8A contact the pipe frame 33A and channel frame 33B from above and over entire lengths thereof. The mouthpiece 8A of each of the grass collecting containers 8 includes a plate member 34 projecting therefrom and defining an engaging bore 34a, and the pipe frame 33A of the fixing frame 33 includes projections 33b. The projections 33b extend through the engaging bores 34a, respectively, when the grass collecting containers 8 are mounted on the fixing frame 33, thereby setting the grass collecting containers 8 in position.

An openable and closable cover 35 will be described next. This cover 35 includes a lower flange 35A adjacent the support frames 31, which flange carries fixed thereto a pair of right and left brackets 36 defining horizontal engaging bores 36a. The support frames 31 each has a projecting plate piece 37 including a horizontal pin 37 having a head. The pins 37 are placeable in rigid engagement with the engaging bores 36a, whereby the cover 35 is vertically pivotable on the pins 37a. This construction constitutes a simple attachment structure for the cover 35 wherein the cover 35 mounted the fixing frame 33 or grass collecting containers 8 is caused to slide transversely of the mower to place the pins 37a in engagement with the engaging bores 36a. The cover 35 has a catch 38 at a side opposite to the side having the brackets 36, which catch is engageable with a metal fastener 39 secured to an end of the channel frame 33B of the fixing frame 33, thereby to maintain the cover 35 in a closed position. The cover 35 covers the grass collecting containers 8 so as to intercommunicate spaces above the containers 8, and includes a netting member 40 extending across an interior space of the cover 35, whereby an air vent passage A is formed to extend from the spaces above the containers 8 to a rearward space in the cover 35. When the containers 8 are filled with grass crippings or disposal bags having poor gas permeability are used, air is vented through the netting member 40 to flow along inside walls of the cover and out through an opening B at a rear lower end of the cover 35. When such disposal bags are not used, air is vented through the grass collecting containers 8.

A construction for connecting the rear duct 9C of the grass discharge duct to the openable and closable cover 35 will be described in detail hereinafter. The pipe frame 33A of the fixing frame 33 include a plate-like holder 41 defining an upwardly opening recess 41a. The cover 35 includes a lateral side defining a downwardly opening recess 35a at a position opposed to the holder 41. The recess 41a of the holder 41 and the recess 35a of the cover 35 in the closed position together form an opening for receiving the rear grass discharge duct 9C. The rear duct 9C has an annular ridge type engaging portion 42 on an outer periphery opposed to the recesses 41a and 35a, the engaging portion 42 including an engaging groove 42a defined between a pair of right and left ridges 42. The engaging groove 42a receives a ridge 35b formed integrally with the cover 35 and an edge of the holder 41 defining the recess 41a, whereby the rear duct 9C is securely attached by engaging inner edges of the two recesses 41a and 35a.

While a riding lawn mower is described in the foregoing embodiment, the present invention is of course applicable to a walking operator type lawn mower as well. In practice, the invention may be modified in various ways. For example, the support frames 31 may extend further rearwardly to include the support member 33 as an integral part thereof. Furthermore, in the described embodiment the grass discharge duct 9 defines the engaging groove 42a in an outer periphery of a rear end portion thereof for receiving the ridge 35b of the cover 35 and the edge of the holder 41. Conversely, engaging grooves may be formed in the cover 35 and the holder.

We claim:

1. A lawn mower comprising
   support frame means including a support frame connectable to a mower body and a support member connected to an upper portion of the support frame,
   grass collecting means supported by the support frame means and having a top opening, the grass collecting means including a mouthpiece extending along the periphery of the top opening, and
   a projecting piece fixed to one of the support frame means and the mouthpiece, and a receiving bore defined in the other of the support frame means and the mouthpiece, the projecting piece and the receiving bore being engageable with each other to connect the grass collecting means to the support frame means for positioning the grass collecting means,
   the support member supporting the periphery of the top opening of the grass collecting means and bearing the entire weight of the grass collecting means and any contents thereof.

2. A lawn mower as claimed in claim 1 wherein the support member supports the mouthpiece of the grass collecting means.

3. A lawn mower as claimed in claim 2 wherein the support member is substantially U-shaped in plan view and has a substantially entire length thereof supporting the mouthpiece of the grass collecting means.

4. A lawn mower as claimed in claim 3 wherein the support member includes a frame substantially U-shaped in plan view and a center frame extending from a center position thereof, whereby the support member has a substantially Eshaped structure for supporting two grass collecting means.

5. A lawn mower as claimed in claim 4 wherein the substantially U-shaped frame is formed of a pipe and the center frame is formed of a channel piece.

6. A lawn mower as claimed in claim 3 wherein the support member includes a holder defining an upwardly opening recess.

7. A lawn mower as claimed in claim 6 further comprising an openable and closable cover mounted on the grass collecting means and including a lateral side defining a downwardly opening recess at a position opposed to the holder (41), the downwardly opening recess defined in the cover in a closed position defining an opening with the upwardly opening recess defined in the holder for receiving a rear end of a grass discharge duct extending from a cutting unit of the lawn mower, the grass discharge duct defining an annular engagement portion extending peripherally of the rear end thereof for engagement with inner edges of the two recesses.

* * * * *